United States Patent
Berg

[11] 3,735,405
[45] May 22, 1973

[54] PASSIVE RADIOMETRIC DETECTION SYSTEM

[76] Inventor: Ib Anthon Berg, 7964 Bolling Drive, Alexandria, Va. 22308

[22] Filed: Jan. 10, 1972

[21] Appl. No.: 216,491

[52] U.S. Cl. ......................... 343/100 ME, 343/112 R
[51] Int. Cl. ............................................... G01j 5/10
[58] Field of Search ............................... 343/100 ME

[56] References Cited

UNITED STATES PATENTS

| | | | |
|---|---|---|---|
| 3,171,126 | 2/1965 | Wiley | 343/100 ME X |
| 3,264,646 | 8/1966 | Gale | 343/100 ME |
| 3,680,111 | 7/1972 | Killion et al. | 343/100 ME |

*Primary Examiner*—T. H. Tubbesing
*Attorney*—Harry M. Saragovitz et al.

[57] ABSTRACT

This invention relates to a system for detecting metallic objects above the earth, and more particularly, to a system of passive directional receiving antennas aimed toward the sky for receiving electromagnetic energy radiated from the earth and reflected from the surfaces of metallic objects within the cones of reception of the antennas. This system makes use of passive receiving antennas discretely arrayed for receiving radiation in the microwave region of the electromagnetic radiation spectrum. The radiation signals received by each antenna are inputs to a like number of frequency band pass filters whereby a metallic object is detected and/or located by radiometric techniques when a certain predetermined level of radiation at a predetermined rate is received.

This invention makes use of the law of Planck which sets forth that a black body radiates electromagnetic radiation at all frequencies as a function of the absolute temperature of the body. Therefore, the earth which approximates a black body, radiates electromagnetic radiation as a function of its surface temperature, approximately 300° Kelvin. When the electromagnetic energy radiated from the earth is reflected from a metallic body above the earth into the cone of reception of an antenna directed toward the sky, there will be an increase in the received radiation toward the 300° Kelvin. A continuing background "noise" radiation is received from the outer sky as a result of the sky's radiometric temperature, approximately 30° Kelvin. The increase toward 300° Kelvin at a rate indicative of the speed of entry of the metallic object into the cone denotes that a metallic body is indeed within such cone of reception.

5 Claims, 6 Drawing Figures

PATENTED MAY 22 1973  3,735,405
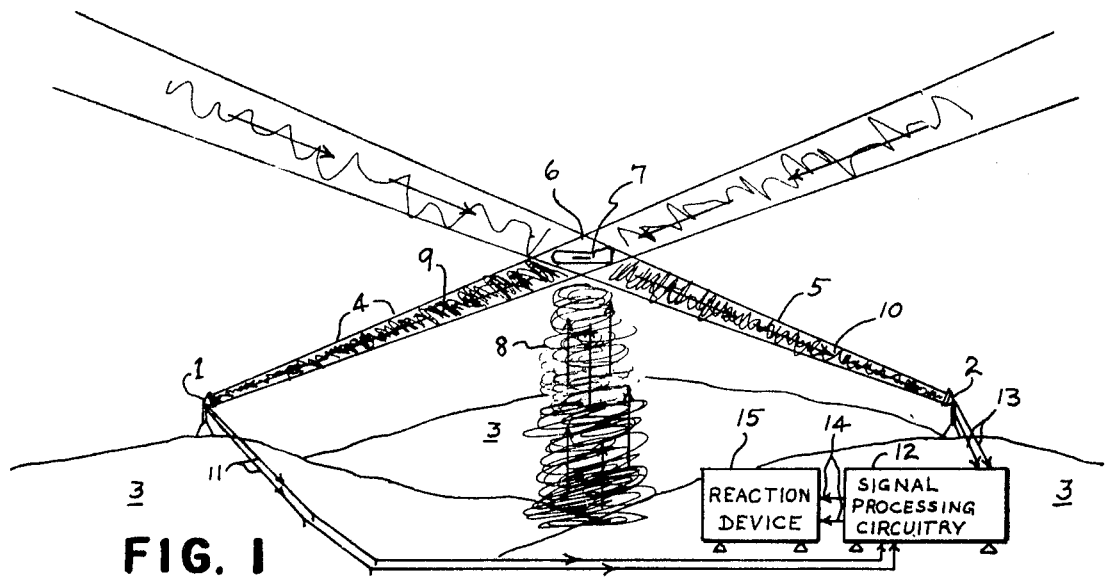
FIG. 1
  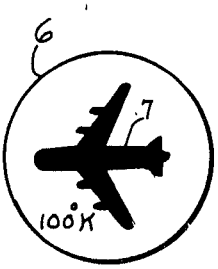  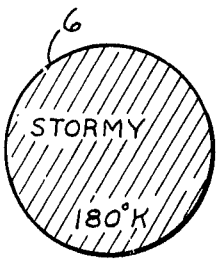  
FIG. 2   FIG. 3   FIG. 4   FIG. 5
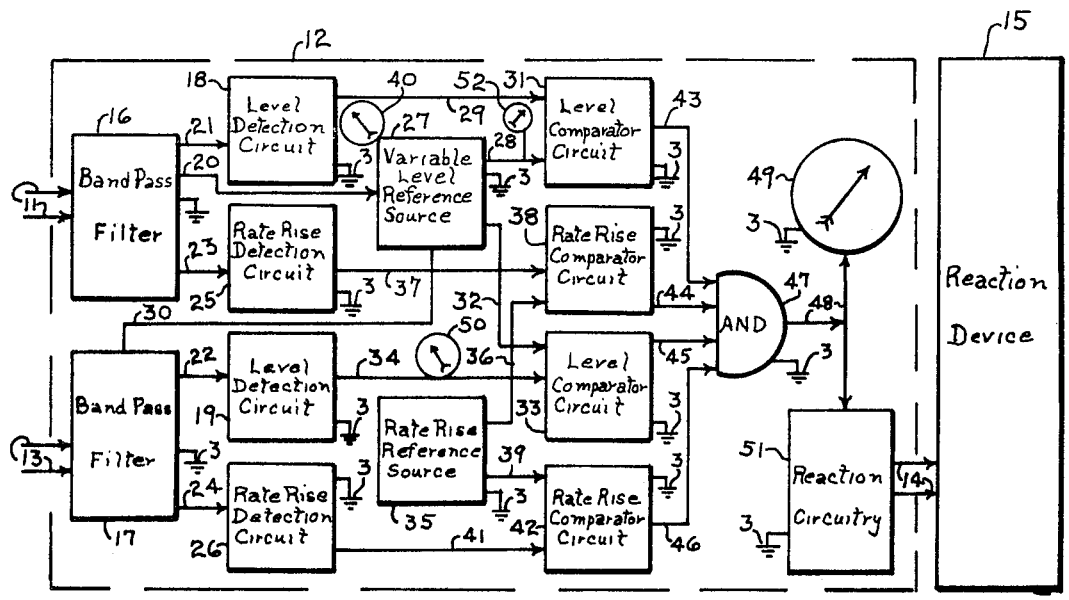
FIG. 6

PASSIVE RADIOMETRIC DETECTION SYSTEM

GOVERNMENT USE

The invention described herein may be manufactured and used by or for the government of the United States of America for governmental purposes without the payment to me of any royalties thereon.

DESCRIPTION OF THE PRIOR ART

U.S. Pat. to Easton No. 3,122,741 issued Feb. 25, 1964 in class 343-15, the only representative prior art known by this inventor, is lacking in the teaching of this invention. The patent is directed to the detection of the presence of aerial vehicles in space using an artificial signal source on the ground which is transmitted directly toward the object in space and reflected back toward the ground for detection purposes. The instant invention does not employ a transmitted artificial signal source but rather the natural electromagnetic radiation from the earth with all of its accompanying advantages.

SUMMARY

The natural electromagnetic radiation of the earth provides the means by which an energy source is available to be reflected by an object passing above the earth whether through the atmosphere or in space. This eliminates the need for a transmitted artificial signal as in the case of radar. The reflected energy received augments the natural energy radiation received from the sky. Each antenna is connected to a band pass filter to which the received energy is applied as an input. The output of the band pass filter is connected to a switching circuitry or means for determining valid signals which is responsive to input signals as modified by background noise which increase in magnitude at a rate proportional to the rate of entry of a metallic object into the cone of reception of the antenna. The antennas, band pass filter and switching circuitry are designed for received radiation over a specific predetermined frequency bandwidth, for example: $35 \pm \frac{1}{2}$ gigahertz. This band is substantially different from the X band used for radar.

For electromagnetic radiation in the microwave region, the coefficient of reflectivity for a metallic surface is approximately 1, and the coefficient of emissivity is approximately zero. This property of substantially no emission from metallic objects and the property of metallic bodies producing effectively near perfect reflection of incident electromagnetic radiation in the microwave region provides for the unique operation of this invention. The frequencies which can be utilized by this invention range from 4 to 300 gigahertz. However, a $35 \pm \frac{1}{2}$ gigahertz range is preferred. Precise location of the metallic body is determined by directing the cones of reception of pairs of antennas to intersect thereby creating a volume of space common to such intersecting pairs. A metallic object in such common volume would produce signals received by such pair of antennas which would indicate presence and location of the metallic object in the common volume, the location of such pair has been previously established. Indicators reveal the analog level of each received signal and the rate rise of such signals. Level comparator and rate-rise comparator circuits compare the input detected signals against corresponding variable level and rate rise reference sources. The outputs of the circuits are supplied as inputs to a logical AND gate circuit to determine coincidence of reflected signals into the several antennas. The output signal of the AND gate is the electrical signal that a metallic body is present in the common volume of the cones of reception of a pair of antennas.

The method whereby the presence of a metallic object in the cones of reception of the antennas is detected, is as follows: The received radiation is calibrated according to a proportional mathematical relationship. Radiated power in watts is proportional to the product of the absolute temperature of the body of the source of radiation, the bandwidth passed by the band pass filter and Boltzmann's constant. This mathematical relationship is an approximation of the law of Planck for black body emitted radiation. The approximation is formulated: Power is proportional to K T B where:

Power is in watts per unit time,
B is the bandwidth of the band pass filter,
T is the absolute temperature of the radiating source in degrees Kelvin and
K is Boltzmann's constant.

This approximation is valid only in the microwave region of the electromagnetic spectrum which, for the purposes of this invention, is for frequencies ranging from 4 gigahertz to 300 gigahertz.

In addition to the reflected earth radiation, the antennas are directed toward the sky and, therefore, receive sky radiation which varies approximately from 30° to 180° Kelvin. The sky radiation level depends on the types and quantities of atmospheric gases, water, fog, clouds and particulate matter in the atmosphere within the cones of reception of the antennas. This is considered to be normal background level or "noise" and is separated from the earth reflected radiation by the circuitry. The radiometric temperature of the radiation emitted by the earth approaches 300° Kelvin. Further description of measured radiometric temperatures of the atmosphere in several conditions and the outer sky are described in US Department of Commerce National Bureau of Standards Report Number 9138 entitled: *Calculated Cloud Contributions to Sky Temperatures at Millimeter Wave Frequencies*, dated February 1966.

When a metallic body such as an aircraft enters the cones of reception of the antennas, the radiation received by the antennas and subsequently measured by the circuitry will increase abruptly in relationship to the speed at which the aircraft enters the cones of reception of the antennas and to the absolute temperature of the source of radiation, the earth.

A plurality of pairs of properly oriented antennas could enable the precise determination of the location of an airplane during landing approach and during flight for route checks. Also, metallic objects intruding a selected space above the surface of the earth could be detected and located and a signal would be produced for photographic purposes, for warning purposes or the like. Obviously, a single antenna would detect the presence of metallic objects in its cone of reception but would not by itself provide information about the exact location of an object within the receiving cone.

The antennas are directed so that the sun does not come into the cone of reflection even though the time of entry would not match the rate of rise produced by the rate rise reference source. The radiometric temperature would be excessive should the sun enter the cone of reception of either antenna.

It is, therefore, an object of this invention to detect the presence of aircraft in a specific volume of space above the earth using a natural energy source so that an artificial energy source such as a transmitter would not be required.

It is another object of this invention to provide a means for effectively determining the position of an aircraft during a landing approach.

It is yet another object of this invention to detect the presence of objects above the earth by using intersecting cones of reception from a plurality of passive directional receiving antennas.

It is still another object of this invention to observe an individual metallic object without the emission of an observer signature.

It is a further object of this invention to determine the direction of flight, velocity and height above ground of aircraft in flight by use of a multiplicity of fixed antenna emplacements on the ground with known distances and angles between respective emplacements.

Another object of this invention is to detect, locate, and activate means for removing an object entering a predetermined volume of space.

The exact nature of this invention as well as other objects and advantages thereof will be readily apparent from consideration of the following specification related to the annexed drawings in which:

BRIEF DESCRIPTION OF THE DRAWINGS

FIG. 1 is a schematic representation of this invention,

FIGS. 2 through 5 show four different circumstances in an area parallel to the surface of the earth in the intersections of the cones of reception of the antennas and FIG. 6 shows in block diagram typical circuitry for this invention.

DESCRIPTION OF A PREFERRED EMBODIMENT

Turning now to the drawings, FIG. 1 shows two narrow beam directional receiving antennas 1 and 2 emplaced on the earth 3 with their respective cones of reception 4 and 5 oriented toward the sky. The intersection of the cones of reception 4 and 5 produces a common volume 6. A metallic object 7, shown as an aircraft for illustrative purposes, has entered the common volume 6. The natural radiation 8 emitted from the earth 3 is reflected from metallic object 7 into the receiving antennas 1 and 2. With metallic object 7 in the common volume 6, the radiation reflections 9 in cone 4 and 10 in cone 5 are received simultaneously by antennas 1 and 2. The reflections received by antenna 1 are transmitted by connectors 11 to circuitry 12 and the reflections received by antenna 2 are transmitted by connectors 13. Circuitry 12 is shown in more detail in FIG. 6. The output of the circuitry 12 is applied through connectors 14 to a reaction device 15. Only during the time the metallic object is moving into the common volume 6 does the radiation level received in circuitry rise rapidly enough to produce an effective output. This output is connected through connector 14 to a reaction device 15. The metallic object 7 can activate a photographic or television camera or some other responsive means needed to be embodied in the reaction device 15.

Electronic circuitry 12 is used to measure the rate of increase and the level of radiation received by antennas 1 and 2 for the purposes of indicating or otherwise reacting to the reflected radiations 9 and 10.

FIG. 2 shows the common volume 6 in the circumstance of clear weather and clean air. The radiometric temperature of the common volume 6 is approximately 30° Kelvin, the radiometric temperature of the sky. In an example, when a metallic object such as airliner 7 enters the common volume 6 as shown in FIG. 3, the composite radiometric temperature rises to approximately 100° Kelvin. This rise of approximately 70° Kelvin is the result of approximately one-fourth of the common volume being occupied by the airliner 7 and the temperature of the remaining three-fourths being the radiometric sky temperature.

FIG. 4 shows that the weather circumstance of the most severe type can raise the radiometric temperature or background noise to approximately 180° Kelvin. This temperature is principally the radiation from the water vapor and particles in the atmosphere. FIG. 5 shows that the presence of an airliner in common volume 6 in the stormy weather raises the radiometric temperature to approximately 210° Kelvine. This approximately 30° Kelvin rise in temperature is indicative of the presence of the airliner as is the illustrative 70° increase shown in FIG. 3.

FIG. 6 shows in block form signal processing circuitry 12. Circuitry 12 is a means for determining valid input signals and for producing a reaction signal when such valid signals are received.

Each of the electrical circuits in circuitry 12 is connected to a common or earth 3.

Connectors 11 and 13 from antennas 1 and 2 respectively are applied as inputs to frequency band pass filters 16 and 17 respectively. The outputs of the filters 16 and 17 are applied as inputs through connectors 21 and 22 to level detection circuits 18 and 19 respectively, and through connectors 23 and 24 to rate rise detection circuits 25 and 26 respectively.

The level detector circuits 18 and 19 function to isolate the signal level representative of a metallic object within the common volume of the two antennas and to cancel the higher level signals received from accidental entry of the sun or moon in the cone of either antenna. That is, the amplitude of the signal passed by the band pass filter is checked to detect a signal level that is distinct from the background noise.

The rate rise detector circuits function to determine if the signal increase is at a rate within the rate rise range of metallic objects desired to be detected. That is, the rate rise is checked to determine if the signal increase is proportional to the velocity of an airplane, for example, with respect to its distance from the antenna. A fast airplane at a great height could have the same rate rise time as a slower airplane at a lower altitude. Also, clouds, rain, sun or moon could produce signal increases but at a rate much slower than an airplane.

A variable level reference source 27 provides an artificial signal that varies proportionally with the level of the background noise or, stated another way, with the electromagnetic changes in the atmosphere not caused by the class of objects desired to be detected. The variable level reference source 27 accomplishes this by monitoring the ambient electromagnetic conditions at all times. When, for example, the atmospheric conditions are such that the radiometric temperature monitored by the antennas through the common volume 6 is 30° Kelvin, a metallic object that occupies one fourth of the common volume causes a rise of 70 degrees Kelvin, as shown in FIGS. 2 and 3, the source 27 provides a bias voltage output proportional to a 60° Kelvin, for example, level rise. As the metallic object enters the common volume 6 and the received temperature rises above 90° Kelvin, the level comparator circuits 31 and 33 determine that the level of the signals passed by the level detector circuits is just above the signals produced by the variable level reference source 27. The level comparator circuits 31 and 33 will produce output trigger signals when the determination is positive, indicating that the level of the received signal is valid.

This unique property is discussed in relation to the example shown in FIGS. 4 and 5. For FIG. 4, at a time, for example, 90 milliseconds prior to the arrival of a metallic object in common volume 6, the radiometric temperature caused by the extreme weather conditions is shown as being 180° Kelvin. At time zero, the moment the metallic object arrives at the edge of the common volume 6, the radiometric temperature is still 180° Kelvin. At 30 milliseconds after time zero, enough of the surface of the metallic object has entered the common volume to raise the radiometric temperature to 182° Kelvin, for example. At 60 milliseconds after the time zero, enough of the metallic object has entered the common volume to raise the temperature to 196° Kelvin. At 90 milliseconds after time zero, the entire metallic object is within the common volume and the radiometric temperature has increased to 210° Kelvin, for example. The variable level reference source 27 has been from time minus 90 milliseconds producing an output signal representative of 25° Kelvin level which is an illustrative valid signal level when the noise level of 180° Kelvin is being monitored. This 25° artificial signal is delayed 90 milliseconds in order that the reference signal being compared with the real time signal can be based on the most recent ambient condition but not yet changed in response to the valid input signal. The level comparator circuits 31 and 33 produce output signals when the outputs of the level detector circuits 18 and 19 go above that which is proportional to 25° Kelvin.

For other background conditions, the variable level reference source 27 provides appropriate artificial signals that are just under the anticipated level provided by a metallic object in the common volume. The automatic bias boosts, or artificial signals, are arbitrarily selected and preset for the anticipated levels of noise conditions so as to provide the degree of accuracy required. Monitoring of the ambient condition by the variable level reference source 27 is accomplished by passing the output of the band pass filters 16 and 17 through connectors 20 and 30 respectively as inputs to the source 27. The source 27 will produce a level reference signal through connector 28 and the actual received level output of the first level detector circuit 18 applied through connector 29 are the inputs to first level comparator circuit 31. The level reference signal is also applied through connector 32 to a second level comparator circuit 33 to which the output of the second level detector level circuit 19 through connector 34 is also applied as an input. The level comparator circuits function to compare the signal passed by the level detector circuits with an artificial reference signal to determine if the level of the isolated signal from the band pass filter is at least as large as the reference signal and to produce an output signal which indicates the presence of a preselected metallic object in the cone of reference of an antenna.

Indicator 40 is connected to connector 29 and provides a means for checking the level of signals differing from background noise in level detection circuit 18. Also, indicator 50 serves a similar purpose for level detection circuit 19. The level of the artificial signal generated by variable level reference source 27 is checked on indicator 52 connected to connector 28. Simultaneously with the level processing, the rate rise reference source 35 produces a signal which is an artificial representation of the rate rise of the monitored signal produced by the entry of a metallic object into the common volume 6. The rate rise comparator circuits 38 and 42 will produce an output signal when the monitored signals received from rate rise detector circuits 25 and 26 through connectors 37 and 41 respectively rise at the rate established by the rate rise reference source 35. This rate is arbitrarily established as the rate normally expected of metallic objects selected to be detected. The outputs of level comparator circuit 31 through connector 43, rate rise comparator circuit 38 through connector 44, level comparator circuit 33 through connector 45 and rate rise comparator circuit 42 through connector 46 are inputs to the AND logic circuit 47. Four simultaneous input signals to AND 47 will produce a trigger output signal through connector 48 to activate reaction circuitry 51.

Rate rise reference source 35 generates a reference signal that has the minimum rate of the anticipated signal passed by the rate detection circuits, representative of the rate of signal level rise produced when a metallic object traverses the cone of reception of an antenna. The rate rise reference signal is applied through connector 36 together with the detected rate rise signal from rate rise detection circuit 25 through connector 37 as inputs to rate rise comparator circuit 38. Also the rate rise reference signal is applied through connector 39 together with the output of rate rise detection circuit 26 through connector 41 as inputs to rate rise comparator circuit 42.

The rate rise comparator circuits function (1) to compare the signal passed by the band pass filters with a rate rise reference signal to determine if the rise rate of the isolated signal from the band pass filter is at least as fast as the reference signal and (2) to produce an output signal which indicates the presence of a preselected metallic object in the cone of reception of an antenna. Connectors 43 and 45 connect the outputs of level comparator circuits 31 and 33 and connectors 44 and 46 connect the outputs of rate rise comparator circuits 32 and 34 as four inputs to AND logic circuit 47.

When a signal is received on all four inputs 43 through 46 simultaneously, AND circuit 47 produces an output signal which is applied through connector 48 as inputs to an indicator 49 and to a reaction circuitry 51. The input to reaction circuitry 51 is in fact an activating signal which enable an output through connectors 14 to activate the reaction device 15. For example, an aircraft in common volume 6 would produce proper signals to activate a television camera as the reaction device 15 or would produce a message that the aircraft had passed through the common volume. In other embodiments the reaction device 15 can be a camera whereby the common volume can be photographed. A unique and distinct activating signal is produced when the metal object enters the cones of reception of the antennas in response to the time rise of the radiation level increase and the magnitude of the radiation level increase.

In the circuitry 12, an alternate embodiment could eliminate the level and rate rise detection circuits and the reference source generators could be tuned to produce output signals that include the background noise as components thereof to check the total signal passed by the band pass filters.

Of course, in cases where the position of an object anywhere in the cone of reception of one antenna is sufficient information, the reaction device could be made responsive to such object in the cone of the one antenna.

So it is seen that I have provided a detection means for metallic objects above the surface of the earth and such detection produces no signature which would betray such detection. Further there is no need for transmitting an artificial signal source since the natural radiation of the earth is utilized.

Since numerous changes may be made in the above described apparatus and circuitry and different embodiments of the invention may be made without departing from the spirit thereof, it is intended that all matter contained in the foregoing description or shown in the accompanying drawings, shall be interpreted as illustrative and not in a limiting sense.

What is claimed is:

1. In combination,
   means for receiving electromagnetic radiation from above the earth, means for isolating from said radiation a discrete frequency band
   within the natural electromagnetic emission of the earth,
   means connecting said means for receiving to said means for isolating,
   variable level signal reference means for producing discrete reference signals having level characteristics representative of the radiometric temperature of said earth emission reflected by a metallic object and for modifying said level characteristics in proportion to changes in the level of background noise signals,
   means connecting said means for isolating to said variable level signal reference means,
   rate rise reference means producing discrete reference signals having rate rise characteristics representative of the rate rise of electromagnetic radiation from the earth reflected by said metallic object,
   means for comparing the level and rate rise of signals in said band with the said level and rate rise reference signals and for producing output signals when said compared signals positively indicate that said metallic object is reflecting said earth radiation into said means for receiving,
   means connecting said variable level signal reference means and said means for isolating to said means for comparing,
   means connecting said rate rise reference means and said means for isolating to said means for comparing,
   reaction means for responding to said output signals from said means for comparing and,
   means connecting said means for comparing to said reaction means.

2. The combination of claim 1 wherein said means for isolating includes
   means for detecting level and rate rise of signals in said band,
   said means connecting said means for isolating to said means for comparing being connected to said means for determining.

3. The combination of claim 1 wherein said means for comparing includes
   logic means producing an output trigger signal when said output signals from each of said means for comparing are produced simultaneously and
   means connecting the outputs of said level and rate rise comparing means as the inputs to said logic means and
   means connecting the output of said logic means as the input to said reaction means.

4. The combination of claim 1 and
   means for indicating the signal level of radiation within said band and
   means connecting said means for indicating to the output of said means for isolating.

5. The method of passively detecting metallic objects above the surface of the earth comprising:
   receiving natural electromagnetic radiation emitted from the earth and reflected by a metallic object above the earth,
   isolating a frequency band in said natural electromagnetic radiation which is optimal in the attenuation and the operating frequency relationship,
   generating an artificial signal representative of the magnitude and of the rate rise of known radiation responses resulting from a moving metallic object reflecting the said natural radiation,
   augmenting said artificial signal to be representative of said known responses under all ambient conditions,
   developing a critical output by comparing said isolated frequency band with said artificial signal to produce an output trigger signal when such comparison is a positive detection of a metallic object above the earth
   and responding to said output trigger signal.

* * * * *